No. 680,083. Patented Aug. 6, 1901.
E. G. TAYLOR.
HAT BLOCK AND GAGE.
(Application filed Nov. 5, 1900.)
(No Model.) 3 Sheets—Sheet 1.

Witnesses:-

Inventor:-
Edgar G. Taylor
by his Attorneys:-

No. 680,083. Patented Aug. 6, 1901.
E. G. TAYLOR.
HAT BLOCK AND GAGE.
(Application filed Nov. 5, 1900.)
(No Model.) 3 Sheets—Sheet 3.

Witnesses:—
Inventor
Edgar G. Taylor
by his Attorneys

UNITED STATES PATENT OFFICE.

EDGAR G. TAYLOR, OF PHILADELPHIA, PENNSYLVANIA.

HAT BLOCK AND GAGE.

SPECIFICATION forming part of Letters Patent No. 680,083, dated August 6, 1901.

Application filed November 5, 1900. Serial No. 35,569. (No model.)

*To all whom it may concern:*

Be it known that I, EDGAR G. TAYLOR, a citizen of the United States, residing in Philadelphia, Pennsylvania, have invented certain Improvements in Hat Blocks and Gages, of which the following is a specification.

My invention consists of a crown-block and brim-gage especially designed for use in making straw hats, although susceptible of general use, the object of my invention being to so construct such crown-block and brim-gage as to provide for readily changing the size and shape of both the crown and brim of the hat. This object I attain in the manner hereinafter set forth, reference being had to the accompanying drawings, in which—

Figure 1:
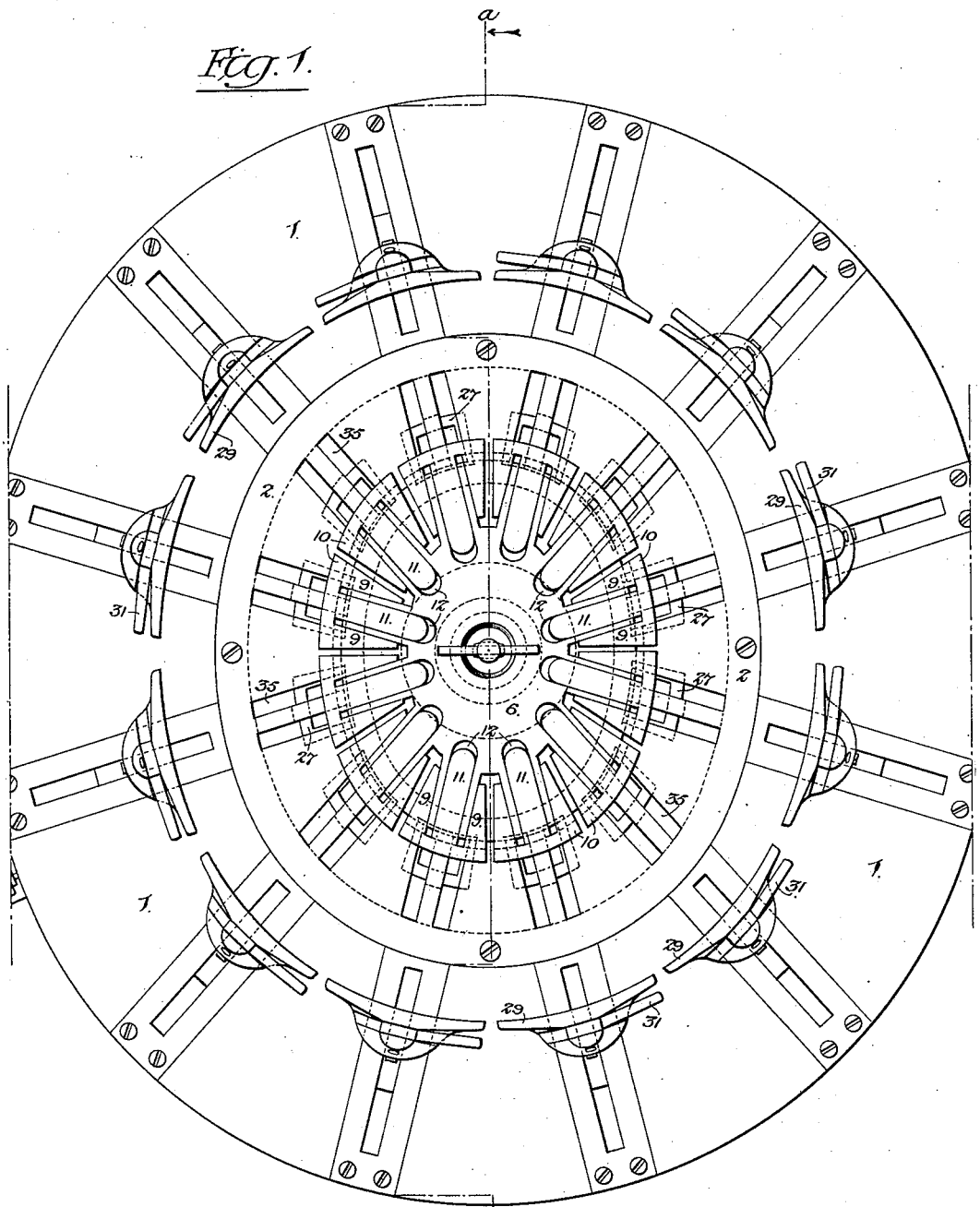
Figure 2:
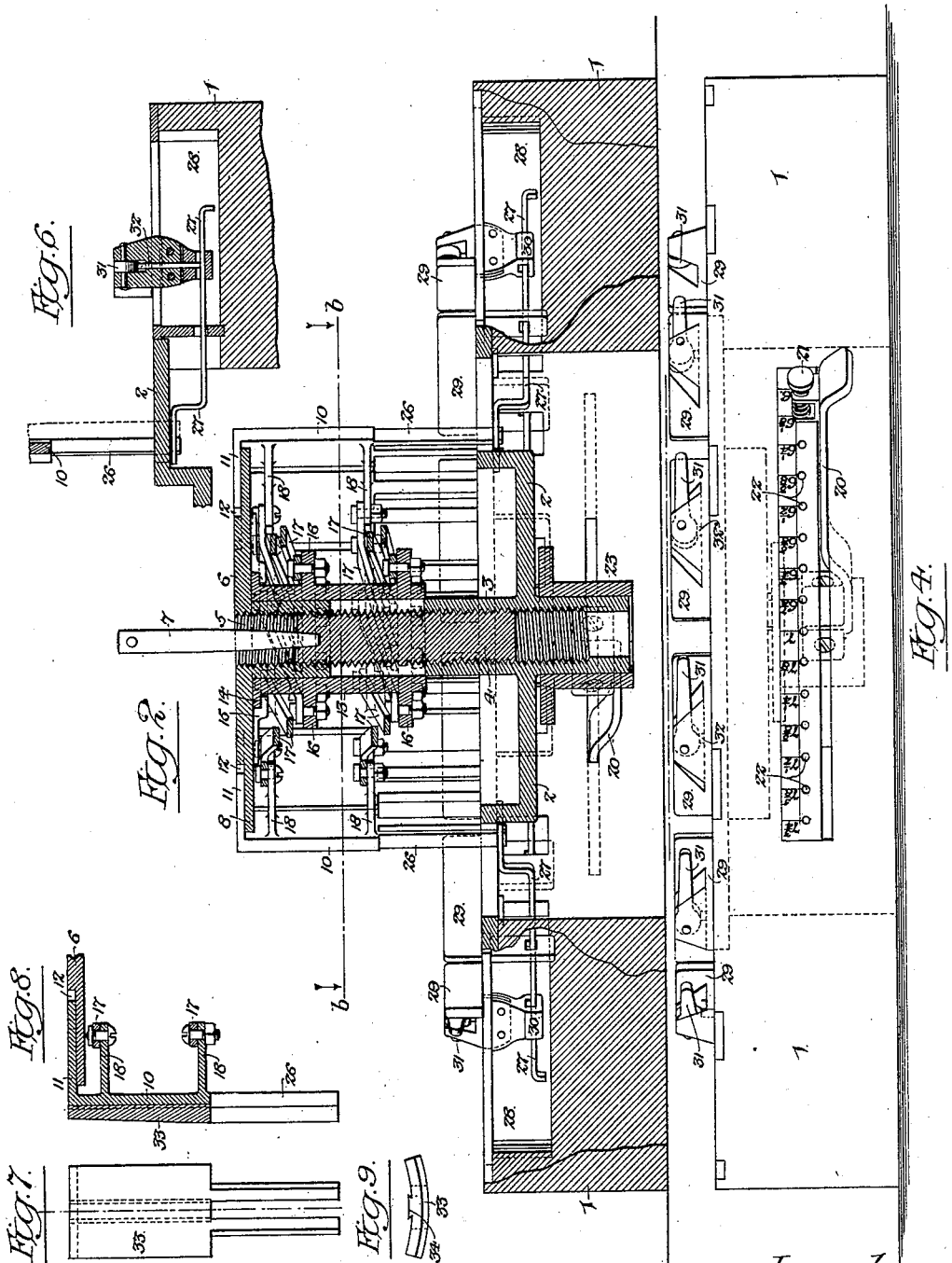
Figure 3:
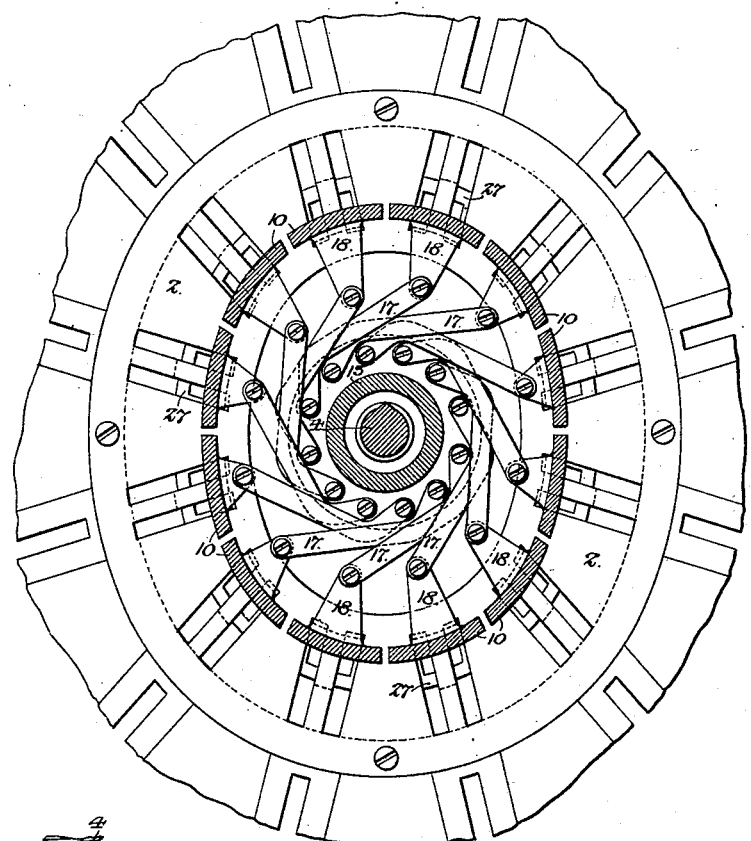
Figure 5:
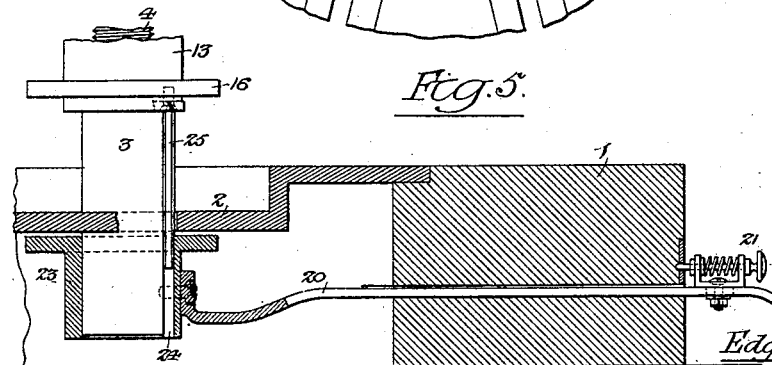

Figure 1 is a plan view of a crown-block and brim-gage constructed in accordance with my invention. Fig. 2 is a section of the same on the line $a\,a$, Fig. 1. Fig. 3 is a sectional plan view on the line $b\,b$, Fig. 2. Fig. 4 is a side elevation of the lower portion of the crown-block. Fig. 5 is an enlarged section of part of the same. Fig. 6 is a sectional view of one of the brim-gages, and Figs. 7, 8, and 9 are views illustrating a special construction of one of the elements of the crown-block.

In the manufacture of straw hats it is usual to employ separate crown-blocks and brim-gages for each of the different sizes or shapes of these parts which are to be made, and the object of my invention is to dispense with this multiplicity of parts by providing an adjustable crown-block and brim-gage which can be set so as to form any desired size, height, or shape of crown and any desired width or shape of brim.

In the drawings, 1 represents a base-block which has a central opening covered by a plate 2, having a central nut 3, to which is adapted the lower threaded portion of a screw-stem 4, the upper portion of which is threaded and is adapted to a nut 5, forming part of the top plate 6 of the crown-block, the screw-stem 4 having a projecting handle 7, whereby it may be readily turned, and the upper and lower threaded portions of said stem being respectively provided with right and left handed threads, so that by turning the screw-stem in one direction the top plate of the crown-block will be lowered and by turning said screw-stem in the opposite direction said top plate will be raised. The use of the double screw is not essential, as the stem 4 might, if desired, be provided with an unthreaded bearing upon either the plate 2 or top plate 6.

The top plate 6 of the crown-block has a series of projecting fingers 8 for the guidance of wings 9 upon a series of segments 10, which can be moved toward or from the center of the crown-block and which serve to determine the size and shape of the crown of the hat, the vertical adjustment of the top plate 6 determining the height of said crown. Each of the segments 10 also has at the top an inwardly-projecting tongue 11, guided in a slot 12 in the top plate 6, so as to preserve the proper alinement of the segment 10 and also aid in the support of the same.

Simultaneous adjustment of the entire series of crown-segments 10 is effected by partial rotation of a sleeve 13, suspended from the top plate 6 of the crown-block by means of a flange 14, which is engaged by clips 15 on said top plate, said sleeve 13 having flanges 16, which are connected by means of rods 17 to lugs 18 on the inner sides of the crown-segments 10, the points of connection of the rods 17 to the flanges 16 and lugs 18 being so disposed that movement of the sleeve 13 in one direction will cause an outward push upon the segments, so as to expand the same, while movement of the sleeve 13 in the opposite direction will cause an inward pull upon the segments and will thus contract the same. Movement is imparted to the sleeve 13 by means of a lever 20, extending outwardly through a slot in the base 1 and having a spring-bolt 21, which can be adapted to any one of a series of openings 22 in said base, said openings being numbered, so as to form a graduated scale corresponding with the different sizes of hat-crowns likely to be required. The lever 20 is connected at its inner end to a sleeve 23, mounted so as to be free to turn upon a depending portion of the nut 3, said sleeve having a groove 24 for the reception of a spline 25, depending from the sleeve 13, whereby any movement of rotation imparted to the sleeve 23 will be transmitted to the sleeve 13 and to the parts carried thereby, the spline 25 permitting of the rise and fall of the sleeve 13 with the top plate of the crown-block.

The lower portion of each of the crown-segments 10 is slotted, so as to form legs 26, which are guided in radial slots 35 in the cap-plate 2 of the base, and the lower ends of the legs of each segment 10 are embraced by the inner end of a bar 27, which projects into a slot 28 in the base 1 and carries one of the brim-gages 29. Hence as the crown-segments are expanded or contracted to change the size of the crown the brim-gages will be likewise expanded or contracted, so as to preserve the proper width of brim. The brim-gages are, however, adjustable radially on the bars 27, so as to provide for any desired width of brim, each gage being locked to its respective bar after having been properly adjusted. This is effected in the following manner: Each bar 27 passes through an eye 30 at the lower end of its respective brim-gage, and between jaws at the top of the gage is hung a cam-lever 31, which acts upon a vertically-guided bolt 32 in such manner that when the lever is in one position said bolt will be relieved from pressure, and the brim-gage can consequently be adjusted radially in respect to the bar 27; but when the lever is adjusted to the locking position, as shown, for instance, in Fig. 4 downward pressure will be imparted to the bolt 32 and the latter will be forced into contact with the bar 27, so as to firmly lock the brim-gage thereto.

The outer faces of the crown-segments 10 are preferably vertical, so as to provide for the formation of a crown with vertical sides, and if any different shape of crown is desired this is provided for by securing to the crown-segments face-plates 33, having the desired external contour, one method of attaching these face-plates being represented in Figs. 7, 8, and 9, on reference to which it will be observed that each face-plate has at the back a dovetailed rib 34, adapted to a correspondingly-dovetailed groove in the face of the crown-segment 10.

Having thus described my invention, I claim and desire to secure by Letters Patent—

1. A hat-gage having a crown-block composed of segments adjustable from and toward the center of the same to vary the size of the crown, and also adjustable vertically to vary the height of the crown, substantially as specified.

2. A hat-gage having a crown-block composed of segments adjustable from and toward the center of the same to vary the size of the crown, and brim-gages connected to and movable with said crown-segments, substantially as specified.

3. A hat-gage having a crown-block composed of segments adjustable from and toward the center of the same, and brim-gages adjustable independently of said crown-segments, substantially as specified.

4. A hat-gage having a crown-block composed of segments adjustable from and toward the center of the same, and brim-gages connected to and movable with said crown-segments, and also adjustable independently of the same, substantially as specified.

5. The combination in a hat-gage, of a vertically-adjustable crown-block and laterally-adjustable brim-gages, substantially as specified.

6. The combination in a hat-gage, of a crown-block composed of segments movable from and toward the center to vary the size of the crown, and also movable vertically to vary the height of the crown, and brim-gages connected to and movable with said crown-segments, substantially as specified.

7. The combination in a hat-gage, of a crown-block composed of segments adjustable from and toward the center to vary the size of the crown, and also adjustable vertically to vary the height of the crown, with brim-gages adjustable laterally in respect to the crown-segments, substantially as specified.

8. The combination in a hat-gage, of a crown-block composed of segments adjustable from and toward the center to vary the size of the crown, and also adjustable vertically to vary the height of the same, with brim-gages connected to and movable with said crown-segments and also adjustable independently of the same, substantially as specified.

9. The combination in a hat-gage, of a base, a crown-block having a top plate supported upon said base, a series of crown-segments, a rotatable sleeve suspended from the top plate and connections between said sleeve and the crown-segments, substantially as specified.

10. The combination in a hat-gage, of a base, a crown-block having a top plate supported above said base and having projecting arms, and a series of crown-segments adjustable from and toward the center of the block and having wings guided on said arms of the top plate, substantially as specified.

11. The combination in a hat-gage, of a base, a crown-block having a top plate supported above said base, and crown-segments adjustable from and toward the center of the block and having tongues guided in slots in said top plate, substantially as specified.

12. The combination in a hat-gage, of a radially-slotted base, a crown-block having a top plate supported above said base, and crown-segments adjustable from and toward the center of the block and guided upon said top plate and also by the slots in the base thereby preserving the proper alinement of the segments in different positions of adjustment, substantially as specified.

13. The combination in a hat-gage, of a base, a crown-block having a top plate supported above said base so as to be vertically adjustable in respect thereto, and a series of crown-segments adjustable from and toward the center of the block and means independent of the crown-blocks for maintaining said top plate in its different positions of adjustment, substantially as specified.

14. The combination in a hat-gage, of a base, a crown-block comprising a top plate supported above said base and adjustable vertically in respect thereto, and a series of crown-segments mounted upon and vertically adjustable with the top plate, said segments being also adjustable from and toward the center of the block, substantially as specified.

15. The combination in a hat-gage, of a base, and a crown-block having a top plate and crown-segments adjustable from and toward the center of the block, and a screw-stem connecting the base and the top plate of the crown-block and serving when turned, to adjust said top plate vertically in respect to the base, substantially as specified.

16. The combination in a hat-gage, of the base, a crown-block comprising a top plate and crown-segments adjustable from and toward the center of the block, and a right and left threaded screw-stem adapted to nuts upon the base and top plate of the crown-block, substantially as specified.

17. The combination in a hat-gage, of a crown-block comprising a vertically-adjustable top plate and laterally-adjustable crown-segments, a sleeve carried by said top plate, rods connecting said sleeve to the crown-segments, an operating-lever and connections between said lever and the sleeve which permit of vertical adjustment of said sleeve, substantially as specified.

18. The combination in a hat-gage, of a crown-block having laterally-adjustable crown-segments, a central sleeve, rods connecting said sleeve to the crown-segments, an operating-lever, connections between the same and the sleeve, and means for locking said lever in different positions of adjustment, substantially as specified.

19. The combination in a hat-gage, of a laterally-guided brim-gage, a bar parallel with said guide, a bolt carried by the gage and adapted to press upon said bar, and a cam-lever also mounted upon the gage for actuating said bolt, substantially as specified.

In testimony whereof I have signed my name to this specification in the presence of two subscribing witnesses.

EDGAR G. TAYLOR.

Witnesses:
F. E. BECHTOLD,
ELIAS H. WHITE.